United States Patent
Margalef et al.

(10) Patent No.: US 9,182,473 B2
(45) Date of Patent: Nov. 10, 2015

(54) SYSTEM, METHOD AND PRODUCT FOR LOCATING VEHICLE KEY USING NEURAL NETWORKS

(71) Applicant: Lear Corporation, Southfield, MI (US)

(72) Inventors: Jordi Virgili Margalef, Valls (ES); Daniel Cirujano Cuesta, Munich (DE); Gema Barreda Martinez, Munich (DE); Sameer Deshpande, Thane (IN); Petru Macovei, Tarragona (ES)

(73) Assignee: Lear Corporation, Southfield, MI (US)

( * ) Notice: Subject to any disclaimer, the term of this patent is extended or adjusted under 35 U.S.C. 154(b) by 434 days.

(21) Appl. No.: 13/888,466

(22) Filed: May 7, 2013

(65) Prior Publication Data

US 2013/0300608 A1     Nov. 14, 2013

Related U.S. Application Data

(60) Provisional application No. 61/645,261, filed on May 10, 2012.

(51) Int. Cl.
*G01S 3/02*     (2006.01)
*G01S 5/02*     (2010.01)

(52) U.S. Cl.
CPC *G01S 5/02* (2013.01); *G01S 5/0252* (2013.01)

(58) Field of Classification Search
CPC ............ G01S 3/02; G01S 5/02; G01S 5/0252
USPC .......................................... 342/451, 450, 463
See application file for complete search history.

(56) References Cited

U.S. PATENT DOCUMENTS

| | | |
|---|---|---|
| 5,555,863 A | 9/1996 | Kokubu |
| 6,091,340 A | 7/2000 | Lee et al. |

(Continued)

FOREIGN PATENT DOCUMENTS

| | | |
|---|---|---|
| CN | 101798888 A | 8/2010 |
| CN | 101871287 A | 10/2010 |

(Continued)

OTHER PUBLICATIONS

Chinese Patent and Trademark Office, First Office Action for the corresponding Chinese Patent Application No. 201310170874.7 mailed May 4, 2015.

*Primary Examiner* — Harry Liu
(74) *Attorney, Agent, or Firm* — Brooks Kushman P.C.

(57) ABSTRACT

A system, method and product for determining a vehicle key fob location. The system may include a control unit for mounting in a vehicle and configured to receive multiple signals, each representing a strength of a wireless signal transmitted between the fob and one of multiple antennas located on a vehicle, and multiple neural networks having a cascade topology. The neural networks may include a first neural network for determining one of a vehicle internal position and a vehicle external position of the fob based on the wireless signal strengths, a second neural network in communication with the first neural network for determining one of multiple vehicle interior positions of the fob based on the wireless signal strengths, and a third neural network in communication with the first neural network for determining one of multiple vehicle exterior positions of the fob based on the wireless signal strengths.

20 Claims, 8 Drawing Sheets

(56) References Cited

U.S. PATENT DOCUMENTS

| | | | |
|---|---|---|---|
| 6,218,929 B1 | 4/2001 | Furuta et al. | |
| 6,304,218 B1 * | 10/2001 | Sugiura | G01S 1/026 342/451 |
| 7,089,099 B2 | 8/2006 | Shostak et al. | |
| 8,165,599 B1 * | 4/2012 | Dronamraju | H04W 64/00 455/456.1 |
| 2008/0042901 A1 * | 2/2008 | Smith | G01S 5/021 342/464 |
| 2008/0048829 A1 | 2/2008 | Nakajima et al. | |
| 2008/0070572 A1 * | 3/2008 | Shkedi | H04W 4/023 455/435.1 |

FOREIGN PATENT DOCUMENTS

| | | |
|---|---|---|
| CN | 102071842 A | 5/2011 |
| CN | 102102470 A | 6/2011 |
| JP | 2007118899 A | 5/2007 |
| WO | 2010/143159 | 12/2010 |

* cited by examiner

SYSTEM, METHOD AND PRODUCT FOR LOCATING VEHICLE KEY USING NEURAL NETWORKS

CROSS-REFERENCE TO RELATED APPLICATION

The present application claims the benefit of U.S. Provisional Patent Application No. 61/645,261 filed on May 10, 2012, the disclosure of which is incorporated in its entirety by reference herein.

TECHNICAL FIELD

The following relates to a method and system for locating a vehicle key, key fob or card using a neural network.

BACKGROUND

Automotive vehicles may include Comfort Access (CA) systems that allow a user to access and start a vehicle just by holding a key, key fob or card. In operation, such systems may perform and/or enable vehicle access and vehicle start functions based on a determined location of the key in or around the vehicle.

To facilitate determining key location, the key, key fob or card may be equipped with one or more antennas and the CA system may employ multiple antennas positioned at multiple locations in the vehicle. The CA system may also include an Electronic Control Unit (ECU) having a decision based algorithm that determines key location based on the transmission of low frequency (LF) signals (e.g., 125 kHz) between the key antenna and the vehicle based antennas.

Calibration of such decision based algorithms typically takes two days on average. Such decision based algorithms and their calibration for use in determining key location are also highly dependent on the particular vehicle, vehicle type, vehicle materials and the number of vehicle antennas and their positions on the vehicle.

As a result, there exists a need for a method and system for determining a vehicle key location having higher flexibility and higher reliability by using one or more neural networks. Such a method and system would provide a single algorithm that could be used for all vehicles, regardless of vehicle type, materials, or the number or locations of vehicle antennas, thereby increasing flexibility. Such a method and system would also greatly reduce calibration time in the field, thereby increasing reliability by using the same algorithm and calibration procedure for all vehicles and thus reducing the risk of manual errors during calibration.

SUMMARY

According to one embodiment disclosed herein, a system is provided for determining a location of a key fob for use in a vehicle access system. The location system may comprise a control unit for mounting in the vehicle. The control unit may be configured to receive a plurality of signals, each signal representing a strength of a wireless signal transmitted between the key fob and one of a plurality of antennas located on a vehicle.

The location system may also comprise a plurality of neural networks having a cascade topology. The plurality of neural networks may comprises a first neural network for determining one of a vehicle internal position and a vehicle external position of the key fob based on the wireless signal strengths. Determining one of a vehicle internal position and a vehicle external position may comprise calculating a plurality of intermediate internal/external position neurons having learned weights and activation functions associated therewith, and calculating an internal/external output neuron for use in indicating one of the vehicle internal position and the vehicle external position of the key fob.

The plurality of neural networks may also comprise a second neural network in communication with the first neural network. The second neural network may be configured for determining one of a plurality of vehicle interior positions of the key fob based on the wireless signal strengths. Determining one of a plurality of vehicle interior positions may comprise calculating a plurality of intermediate interior position neurons having learned weights and activation functions associated therewith, and calculating a plurality of interior position output neurons for use in indicating one of a plurality of vehicle interior positions of the key fob.

The plurality of neural networks may also comprise a third neural network in communication with the first neural network. The third neural network may be configured for determining one of a plurality of vehicle exterior positions of the key fob based on the wireless signal strengths. Determining one of a plurality of vehicle exterior positions of the key fob may comprise calculating a plurality of intermediate exterior position neurons having learned weights and activation functions associated therewith, and calculating a plurality of exterior position output neurons for use in indicating one of a plurality of vehicle exterior positions of the key fob.

According to another embodiment disclosed herein, a computer readable medium having non-transitory computer executable instructions stored thereon is provided for determining a location of a key fob for use in a vehicle access system. The computer executable instructions may comprise instructions for determining one of a vehicle internal position and a vehicle external position of the key fob based on signal strengths of a plurality of wireless signal transmitted between the key fob and a plurality of antennas located on a vehicle. Determining one of a vehicle internal position and a vehicle external position may comprise a first neural network calculating a plurality of intermediate internal/external position neurons having learned weights and activation functions associated therewith, and calculating an internal/external output neuron for use in indicating one of the vehicle internal position and the vehicle external position of the key fob.

The computer executable instructions may further comprise instructions for determining one of a plurality of vehicle interior positions of the key fob based on the wireless signal strengths. Determining one of a plurality of vehicle interior positions comprises a second neural network calculating a plurality of intermediate interior position neurons having learned weights and activation functions associated therewith, and calculating a plurality of interior position output neurons for use in indicating one of a plurality of vehicle interior positions of the key fob.

The computer executable instructions may further comprise instructions for determining one of a plurality of vehicle exterior positions of the key fob based on the wireless signal strengths. Determining one of a plurality of vehicle exterior positions of the key fob comprises a third neural network calculating a plurality of intermediate exterior position neurons having learned weights and activation functions associated therewith, and calculating a plurality of exterior position output neurons for use in indicating one of a plurality of vehicle exterior positions of the key fob. The first, second and third neural networks may also have a cascade topology.

According to a further embodiment disclosed herein, a method is provided for determining a location of a key fob for use in a vehicle access system. The method may comprise receiving a plurality of signals, each signal representing a strength of a wireless signal transmitted between the key fob and one of a plurality of antennas located on a vehicle. The method may further comprise determining one of a vehicle internal position and a vehicle external position of the key fob based on the wireless signal strengths, wherein determining one of a vehicle internal position and a vehicle external position comprises a first neural network calculating a plurality of intermediate internal/external position neurons having learned weights and activation functions associated therewith, and calculating an internal/external output neuron for use in indicating one of the vehicle internal position and the vehicle external position of the key fob.

The method may further comprise determining one of a plurality of vehicle interior positions of the key fob based on the wireless signal strengths, wherein determining one of a plurality of vehicle interior positions comprises a second neural network calculating a plurality of intermediate interior position neurons having learned weights and activation functions associated therewith, and calculating a plurality of interior position output neurons for use in indicating one of a plurality of vehicle interior positions of the key fob. The method may further comprise determining one of a plurality of vehicle exterior positions of the key fob based on the wireless signal strengths, wherein determining one of a plurality of vehicle exterior positions of the key fob comprises a third neural network calculating a plurality of intermediate exterior position neurons having learned weights and activation functions associated therewith, and calculating a plurality of exterior position output neurons for use in indicating one of a plurality of vehicle exterior positions of the key fob. The first, second and third neural networks may have a cascade topology.

A detailed description of these embodiments is set forth below together with accompanying drawings.

DETAILED DESCRIPTION

Figure 1:
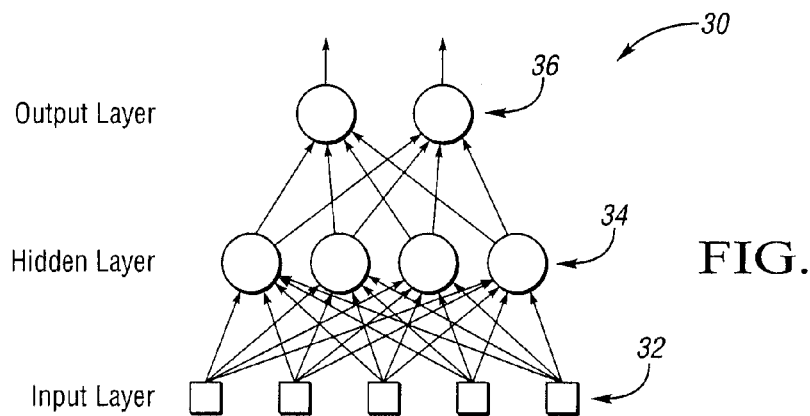
FIG. 1 is a simplified, exemplary block diagram of a neural network.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

With reference to FIGS. 1-14, various embodiments of the method and system disclosed herein are shown and described. For ease of illustration and to facilitate understanding, similar reference numerals have been used throughout the following description to denote similar elements, parts, items or features in the drawings, where applicable.

Figure 2:
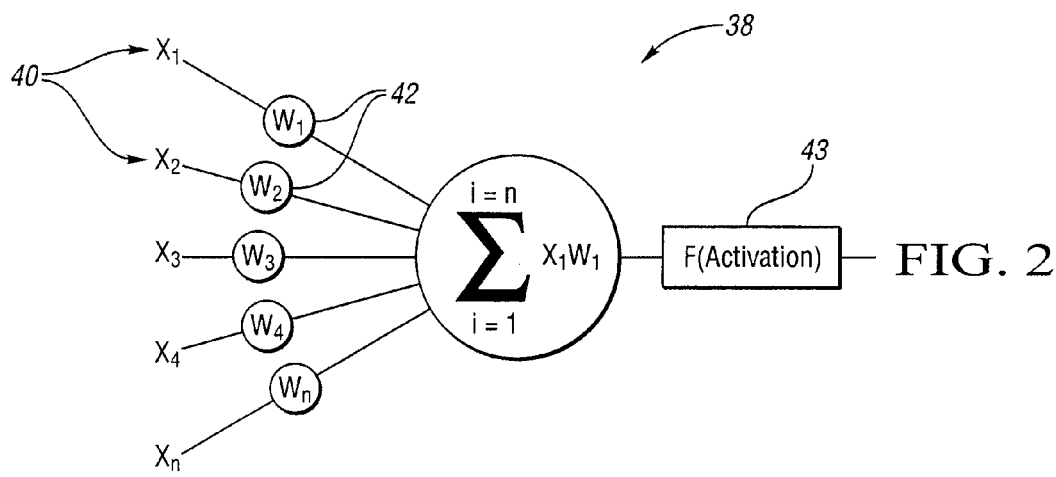
FIG. 2 is a simplified, exemplary block diagram of a neuron for use in a neural network, such as the neural network shown in FIG. 1.
Figure 3:
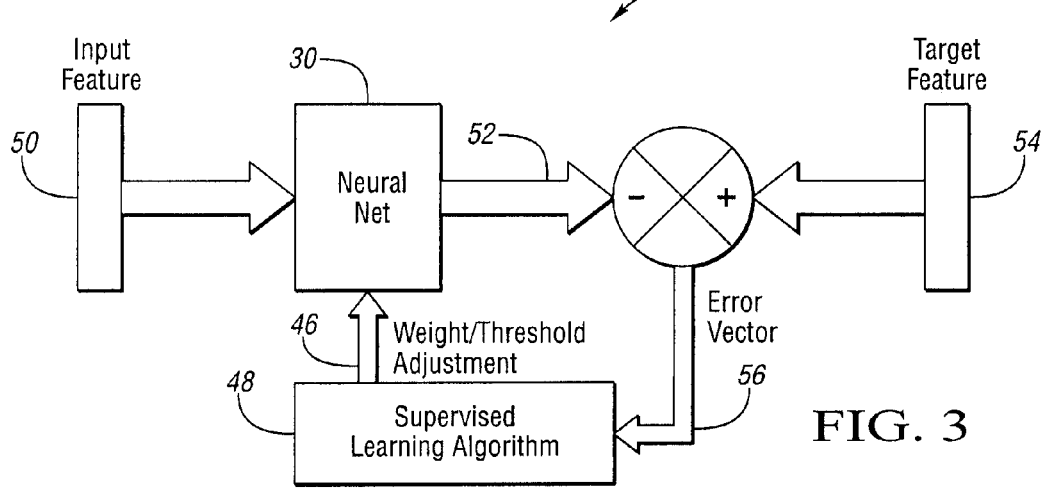
FIG. 3 is a simplified, exemplary block diagram of a system for training a neural network using supervised or associative learning.

As seen therein, FIGS. 1-3 present an overview regarding neural networks, including modeling techniques using neurons, as well as training procedures such as supervised or associative learning using training data to produce neuron weights. In particular, FIG. 1 shows a simplified, exemplary block diagram of a neural network 30, which is a modeling technique based on the observed behavior of biological neuron and used to mimic the performance of a system. Neural networks include a set of elements that start out connected in a random pattern and, based upon operational feedback, are molded into the pattern required to generate the required results. Neural networks, which including an input layer 32, a hidden layer 34 and an output layer 36, are used in applications such as robotics, diagnosing, forecasting, image processing and pattern recognition.

FIG. 2 shows a simplified, exemplary block diagram of an artificial neuron 38 for use in a neural network, such as the neural network 30 shown in FIG. 1. As seen therein, a neuron 38 can have any number of inputs 40 from one to n, where n is the total number of inputs 40. The inputs 40 may be represented therefore as $x_1, x_2, x_3, \ldots x_n$. Corresponding weights 42 for the inputs 40 can be represented as $w_1, w_2, w_3, \ldots w_n$. The summation of the weights 42 multiplied by the inputs 40 is the input for an activation function 43 (e.g., sigmoid, cosine, sine, lineal).

A simplified, exemplary block diagram of a system 44 for training a neural network 30 using supervised or associative learning is shown in FIG. 3. Supervised learning or associative learning is a technique in which the neural network 30 is trained by providing it with input and matching output patterns. More particularly, based on a weight/threshold adjustment 46 from a supervised learning algorithm 48, as well as an input feature 50, the neural network 30 provides an output 52. A comparison of the neural network output 52 and a target feature 54 provides an error vector 56, which is fed back to the supervised learning algorithm 48 for use in providing the weight/threshold adjustment 46. In such a fashion, the neural network 30 may be trained to output the required results of a system being emulated.

Figure 4:
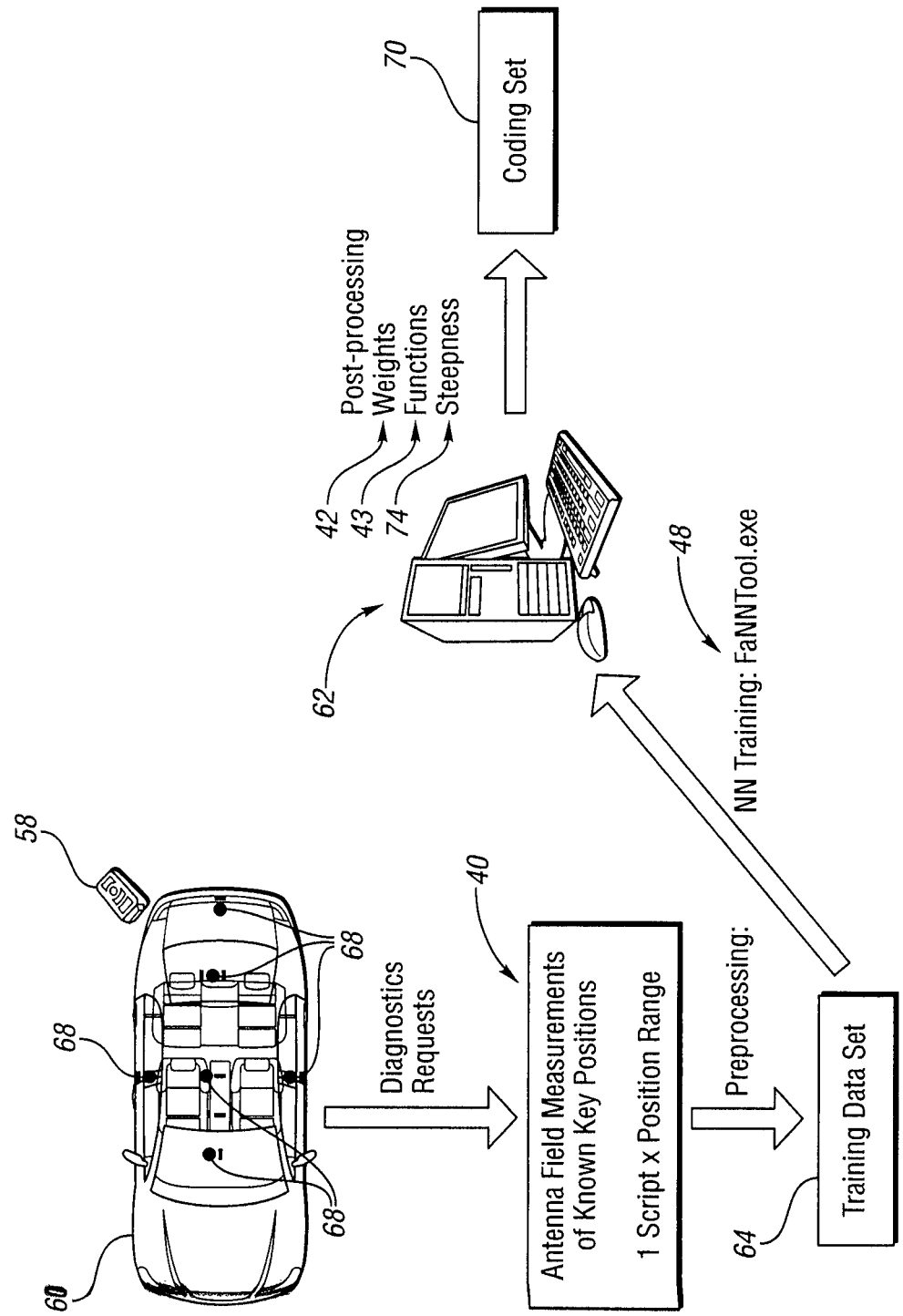
FIG. 4 is a simplified, exemplary block diagram of a procedure for training a neural network for use in determining a location of a vehicle key fob.
Figure 5:
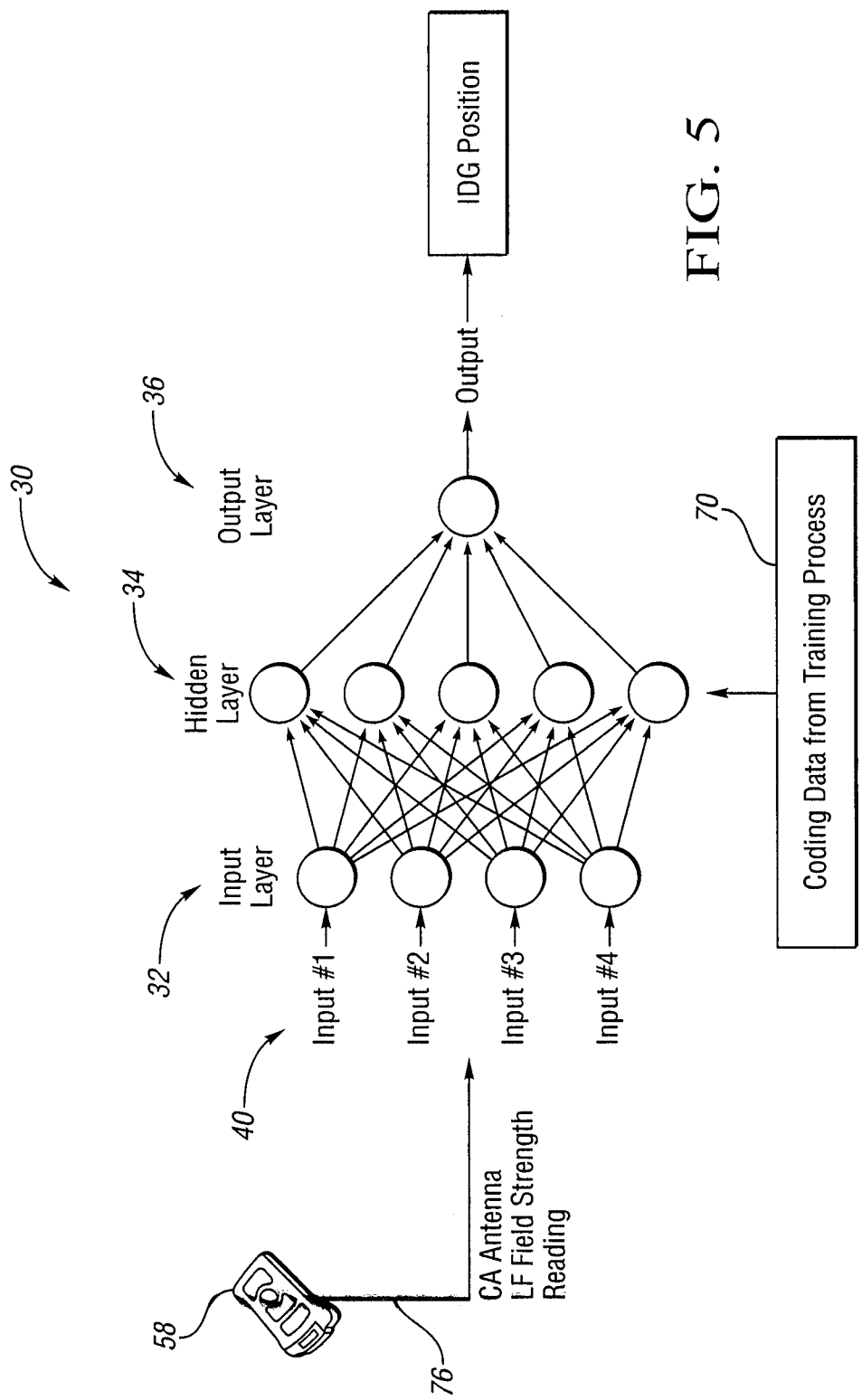
FIG. 5 is a simplified, exemplary block diagram illustrating the use of a neural network for determining a location of a vehicle key fob.

FIG. 4 is a simplified, exemplary block diagram of a procedure for training a neural network 30 for use in determining a location of a vehicle key fob 58. FIG. 5 is a simplified, exemplary block diagram illustrating the use of a neural network 30 for determining a location of a vehicle key fob 58. More particularly, FIGS. 4 and 5 depict a neural network training procedure for a target vehicle 60 using a personal computer (PC) 62, and the use of such a neural network 30. As seen therein, training data will be taken in a real vehicle 60 during the calibration process and such data will be provided to a supervised learning algorithm 48 in the PC 42 for training. The output of the training procedure will be a set of weights 42 which will be included in the targets as coding data.

As seen in FIG. 4, a supervised learning algorithm 48 may be employed for such training using training data sets 64 such as signal or antenna field strength readings 66 of wireless signals transmitted between the key fob 58 and multiple antennas 68 located at multiple positions on a vehicle 60. In that regard, the supervised learning algorithm 48 FaNNTool.exe shown in FIG. 4 is an example of a commercially available tool that can be used to perform supervised training of a neural network 30. Supervised learning using such training data sets 64 produces post-processing network coding data sets 70 which may include neuron weights 42, functions 43, and parameters or steepness 74.

Referring now to FIG. 5, such coding data 70 may then be used by the network 30 to determine the location or position of a key 58. As seen therein, field strength readings 76 for wireless LF signals transmitted between multiple comfort access antennas 68 located on the vehicle 60 and the key fob 58 may be provided as inputs 40 to the input layer 32 of the neural network 30. Coding data 70 from the training process may be provided to the hidden layer 34 of the neural network 30 and used, together with the inputs 40, to output from the output layer 36 of the neural network 30 a relative location or position of the key fob 58.

FIGS. 6-12 depict two types of neural network topologies, namely, classical and cascade topologies. As seen therein, the classical topology includes a single network, while the cascade topology includes multiple networks in a hierarchical configuration.

Figure 6:
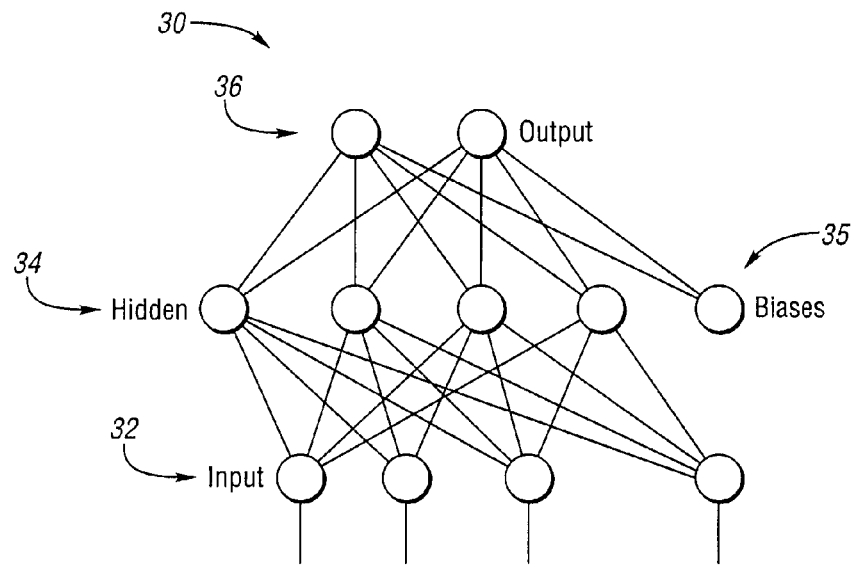
FIG. 6 is a simplified, exemplary block diagram of a classical topology neural network for use in determining a location of a vehicle key fob.

With reference to FIG. 6, a simplified, exemplary block diagram of a neural network 30 having a classic topology is shown, the network 30 for use in determining a location of a vehicle key fob 58. The network 30 includes an input layer 32, a hidden layer 34 including a bias neuron 35, and an output layer 36. Such a neural network 30 has less complexity associated therewith to implement the network 30 because there are fewer connections between neurons and there are only two activation functions (intermediate layers and output layers). Training of such a classic topology neural network 30 may require approximately one day.

Figure 7:
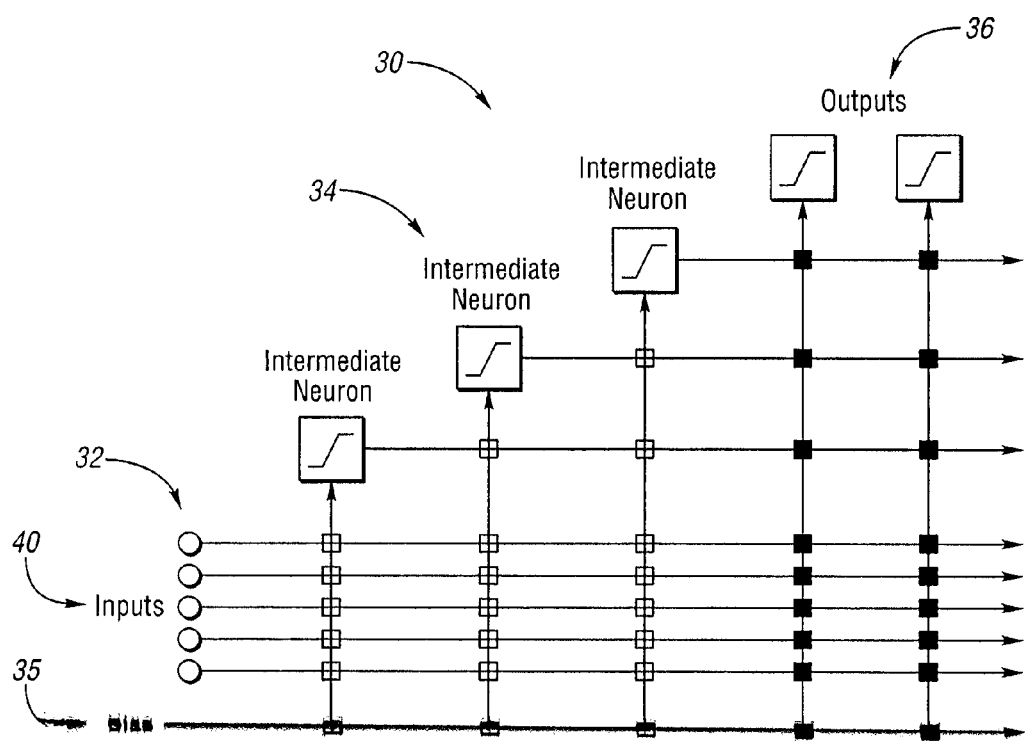
FIG. 7 is a simplified, exemplary block diagram of a cascade topology neural network for use in determining a location of a vehicle key fob.

With reference to FIG. 7, a simplified, exemplary block diagram of a neural network 30 having a cascade topology is shown, the network 30 for use in determining a location of a vehicle key fob 58. The network 30 includes input layer 32 neurons including a bias neuron 35, the input layer 32 neurons configured to receive inputs 40, a hidden layer 34 including intermediate neurons, and an output layer 36 providing outputs. Such a neural network 30 has more complexity associated therewith to implement the network 30 because there are more connections between neurons and different activation functions for each neuron. However, training of such a cascade topology neural network 30 may require approximately two hours.

Figures 8, 9:
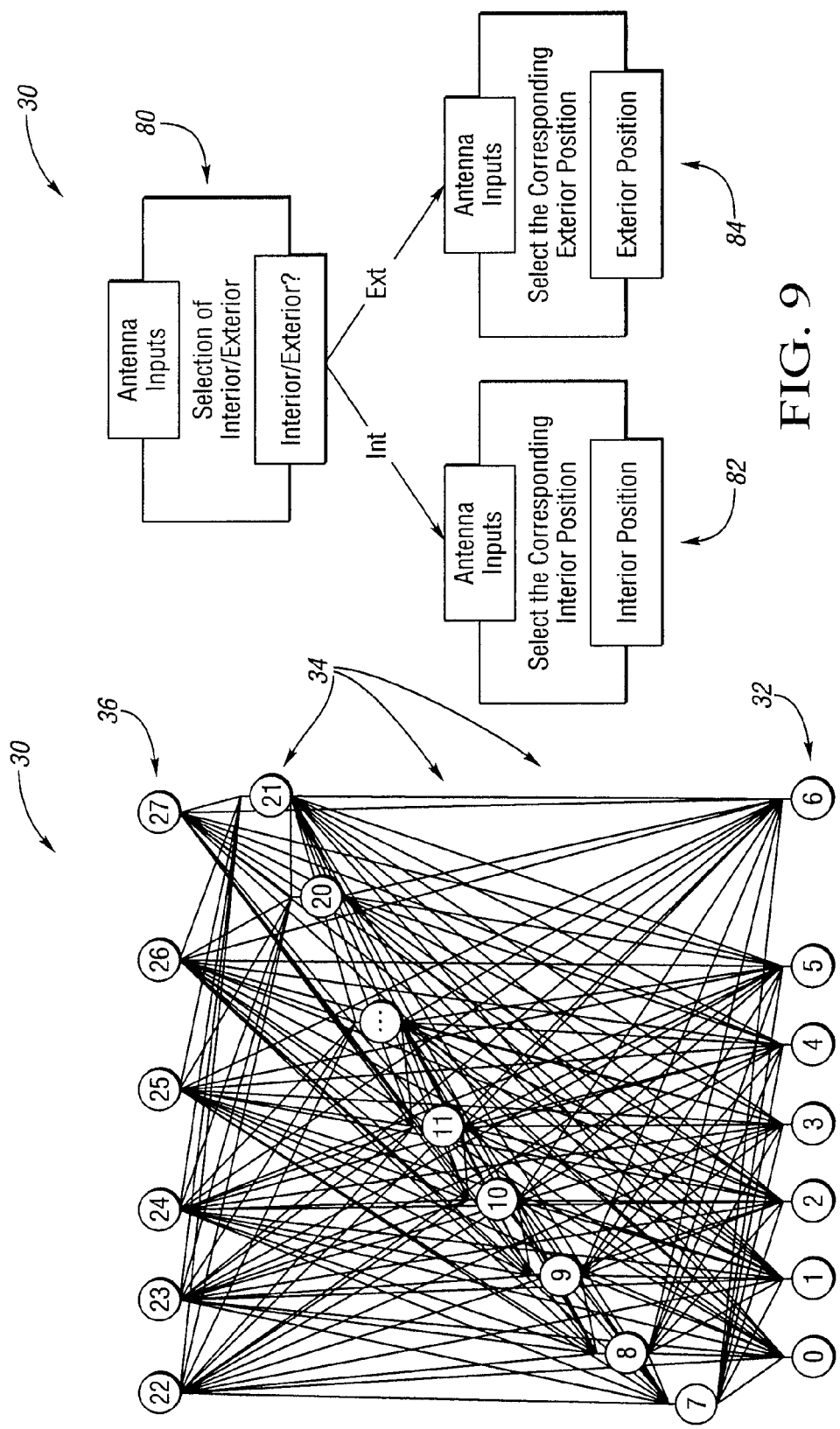
FIG. 8 is a more detailed exemplary block diagram of a classical topology neural network for use in determining a location of a vehicle key fob.
FIG. 9 is a more detailed exemplary block diagram of a cascade topology neural network for use in determining a location of a vehicle key fob, including a neural network for determining an internal or external position of the key fob relative to a vehicle, a neural network for determining a particular interior vehicle position of the key fob, and a neural network for determining a particular exterior vehicle position of the key fob.

FIG. 8 is a more detailed exemplary block diagram of a classical topology neural network 30 for use in determining a location of a vehicle key fob 58. As seen therein, the neural network 30 may include input neurons 0-5 and a bias neuron 6. Input neurons 0-5 are configured to receive inputs 40 from multiple antennas 68 on a vehicle, the inputs 40 representing signal strengths of wireless signals transmitted between the antennas 68 and the key fob 58. The network 30 may also include intermediate neurons 7-21. In that regard, to simplify the illustration of the classical network topology, FIG. 8 includes one hidden layer neuron without a particular reference numeral (labeled " . . . ") representing multiple hidden layer neurons not specifically shown (i.e., neurons 12-19).

The network 30 may also include output neurons 22-27 representing various positions of the key fob 58 relative to the vehicle 60. Such a neural network 30 includes 342 total weights 42, 21 total functions 43, and 21 total parameters 74. It should be noted, however, that the number of neurons shown (e.g., input neurons, intermediate neurons, output neurons) is exemplary only, and networks having a lesser or greater number of neurons may be employed. Such a classical topology neural network 30 provides various advantages including high accuracy, a single network (input→output), neural network learning outside the target (e.g., in a PC), high flexibility and high vehicle validation. A classical topology network may have greater computational costs and a higher number of codings 50 (i.e., weights 42, activation functions 72, function parameterization 74).

Referring next to FIG. 9, a more detailed exemplary block diagram of a cascade topology neural network 30 is shown for use in determining a location of a vehicle key fob 58. As seen therein, the cascade topology network 30 includes a first neural network 80 for determining an internal or external position of the key fob 58 relative to a vehicle 60, a second neural network 82 for determining a particular interior vehicle position of the key fob 58, and a third neural network 84 for determining a particular exterior vehicle position of the key fob 58.

More particularly, the first neural network 80 is configured to receive inputs 40 from multiple antennas 68 on a vehicle, the inputs 40 representing signal strengths of wireless signals transmitted between the antennas 68 and the key fob 58. Based on such antenna inputs 40, the first neural network 80 determines or selects an interior, internal or inside position for the key fob 58 relative to the vehicle 60, or an exterior, external or outside position of the key fob 58 relative to the vehicle 60. An internal position determination by the first neural network 80 may be communicated to the second neural network 82 for determining a particular vehicle interior position of the key fob 58. Alternatively, an external position determination by the first neural network 80 may be communicated to the third neural network 84 for determining a particular vehicle exterior position of the key fob 58.

In that regard, the second neural network 82 is configured to receive the internal position determination by the first neural network 80, and to receive the antenna inputs 40 previously described. Using such information, the second neural network 82 determines or selects one of a plurality or multiple possible interior positions of the key fob 58 inside the vehicle 60. Similarly, the third neural network 84 is configured to receive the external position determination by the first neural network 80, and to receive the antenna inputs 40 previously described. Using such information, the third neural network 84 determines or selects one of a plurality or multiple possible exterior positions of the key fob 58 outside the vehicle 60.

Such a cascade topology neural network 30 provides various advantages including high accuracy, a single network (input→output), neural network learning outside the target (e.g., in a PC), high flexibility and high vehicle validation. A classical topology network also has lower computational costs and a lower number of codings 50 (i.e., weights 42, activation functions 43, function parameterization 74). The use of three neural networks 80, 82, 84 may increase software complexity. It should also be noted that the number and configuration of neural networks shown in the cascade topology of FIG. 9 is exemplary only, and a greater or lesser number of networks with different cascade topologies may be employed.

Figure 10:
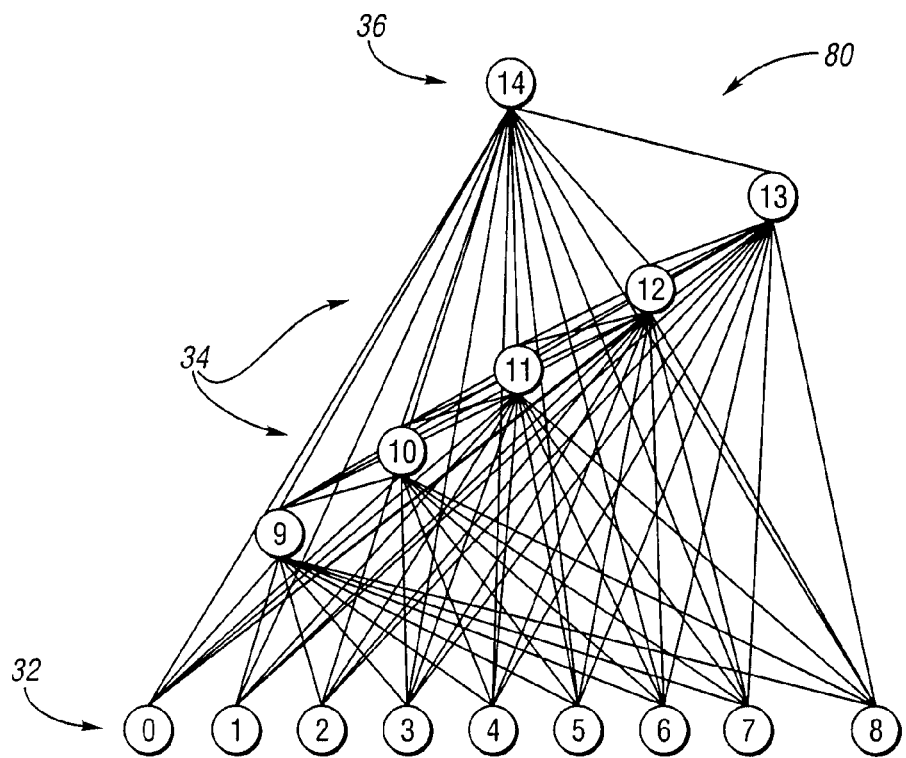
FIG. 10 is a more detailed exemplary block diagram of a neural network for determining an internal or external position of a key fob relative to a vehicle.

Referring now to FIG. 10, a more detailed exemplary block diagram of a neural network 80 for determining an internal or external position of a key fob 58 relative to a vehicle 60 is shown. As seen therein, the neural network 80 may include input neurons 0-7 and a bias neuron 8. Input neurons 0-7 are configured to receive inputs 40 from multiple antennas 68 on a vehicle, the inputs 40 representing signal strengths of wireless signals transmitted between the antennas 68 and the key fob 58. The network 80 may also include intermediate neurons 9-13. The network 80 may also include an output neuron 14 representing a determination of an internal or an external position of the key fob 58 relative to the vehicle 60. Such a neural network 80 includes 69 total weights 42, six total functions 43, and six total parameters 74. It should be noted, however, that the number of neurons shown (e.g., input neurons, intermediate neurons, output neuron) is exemplary only, and networks having a lesser or greater number of neurons may be employed.

Figure 11:
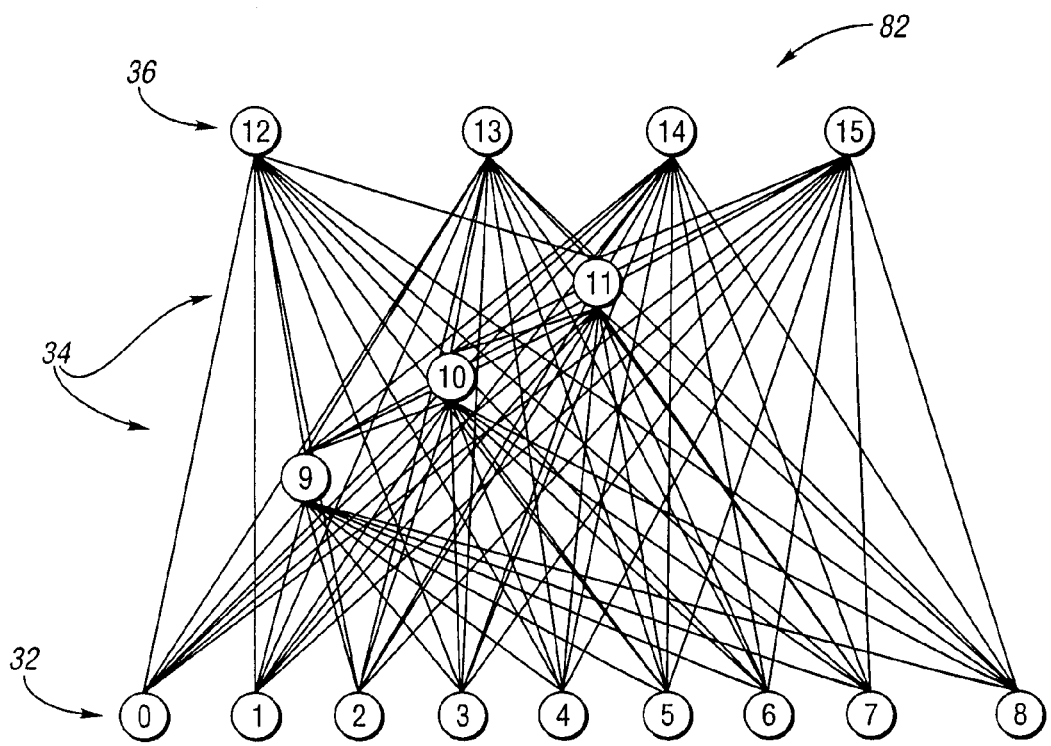
FIG. 11 is a more detailed exemplary block diagram of a neural network for determining a particular interior vehicle position of a key fob.

Referring next to FIG. 11, a more detailed exemplary block diagram of a neural network 82 for determining a particular interior vehicle position of a key fob 58 is shown. As seen therein, the neural network 82 may include input neurons 0-7 and a bias neuron 8. Input neurons 0-7 are configured to receive antenna inputs 40. The network 82 may also include intermediate neurons 9-11. The network 82 may also include output neurons 12-15 representing a determination of one of four particular interior position of the key fob 58 inside the vehicle 60. Such a neural network 82 includes 77 total weights 42, seven total functions 43, and seven total parameters 74. It should be noted, however, that the number of neurons shown (e.g., input neurons, intermediate neurons, output neurons) is exemplary only, and networks having a lesser or greater number of neurons may be employed.

Figure 12:
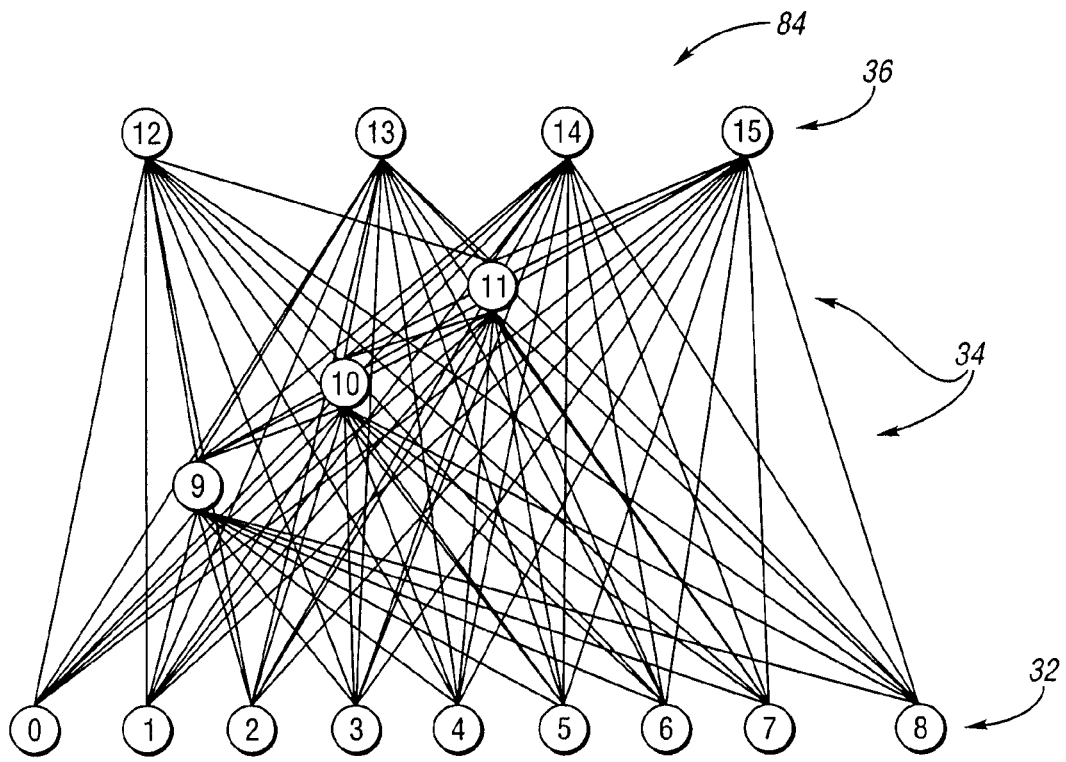
FIG. 12 is a more detailed exemplary block diagram of a neural network for determining a particular exterior vehicle position of a key fob.
Figure 13:
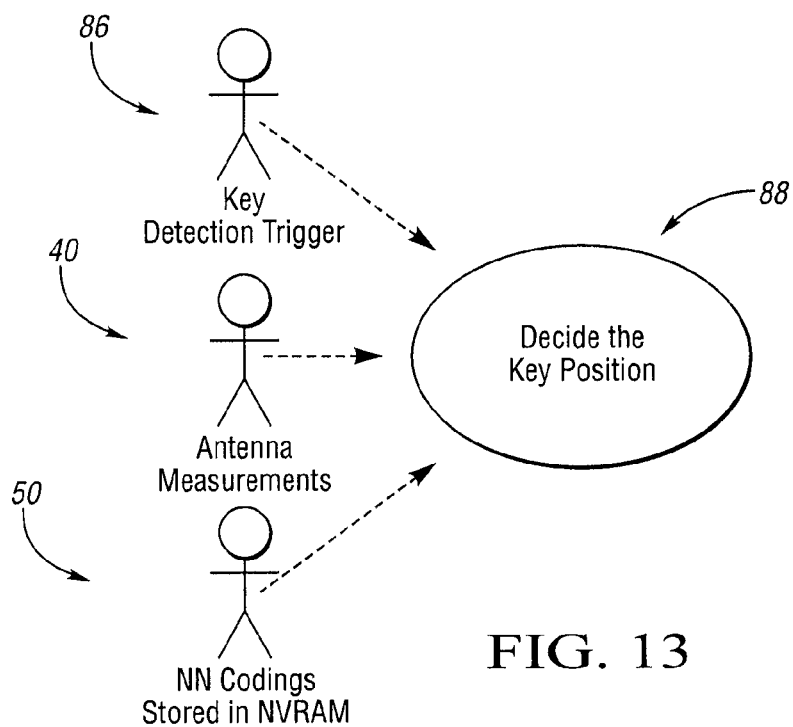
FIG. 13 is a simplified, exemplary use case diagram for a neural network for determining a location of a vehicle key fob.
Figure 14:
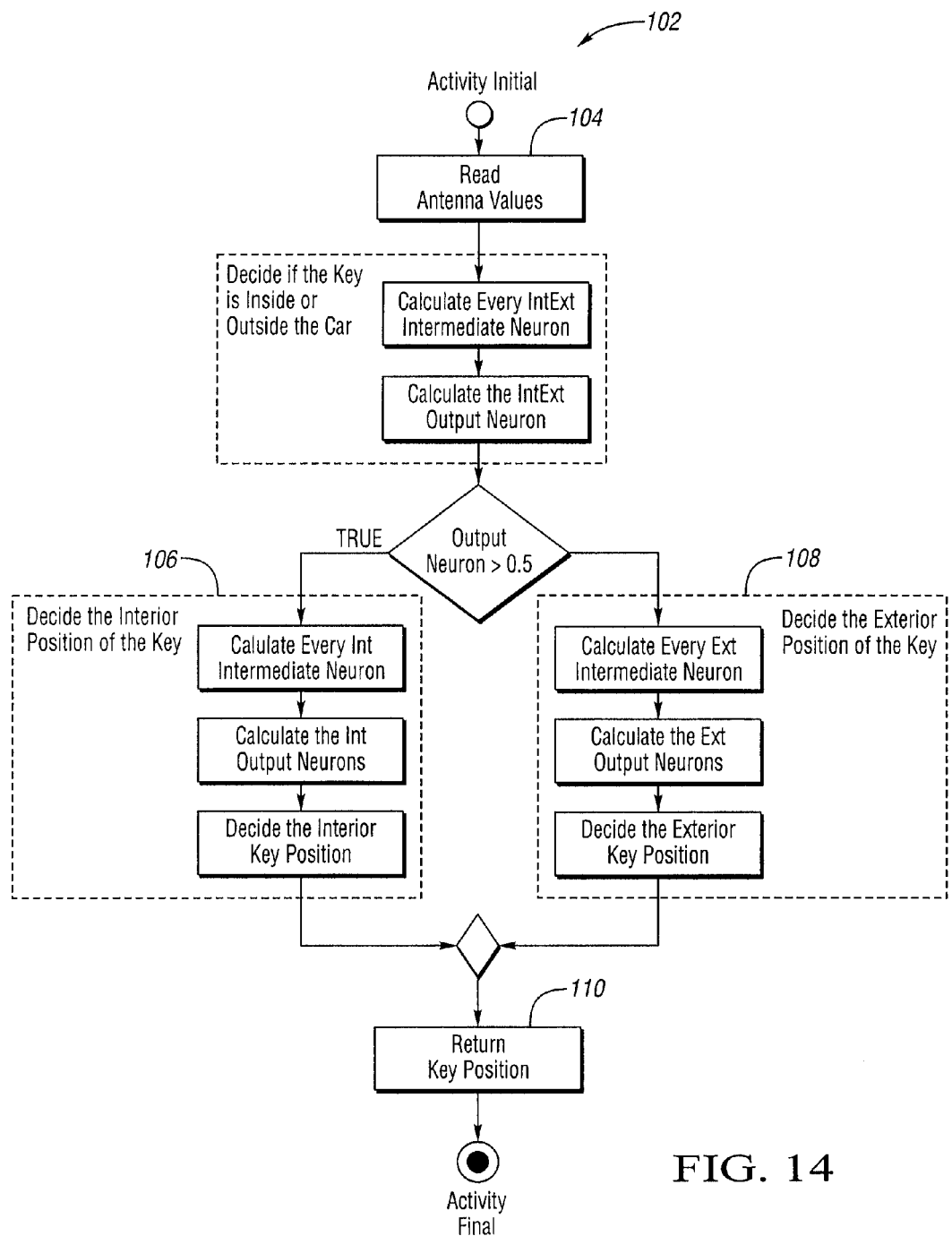
FIG. 14 is a simplified, exemplary flow chart or activity diagram for a method for determining a location of a vehicle key fob using neural networks.

Referring next to FIG. 12, a more detailed exemplary block diagram of a neural network 84 for determining a particular exterior vehicle position of a key fob 58 is shown. As seen therein, the neural network 84 may include input neurons 0-7 and a bias neuron 8. Input neurons 0-7 are configured to receive antenna inputs 40. The network 84 may also include intermediate neurons 9-11. The network 82 may also include output neurons 12-15 representing a determination of one of four particular exterior position of the key fob 58 outside the vehicle 60. Such a neural network 82 includes 77 total weights 42, seven total functions 43, and seven total parameters 74. It should be noted, however, that the number of neurons shown (e.g., input neurons, intermediate neurons, output neurons) is exemplary only, and networks having a lesser or greater number of neurons may be employed FIGS. 13 and 14 depict both general and specific implementation details of a cascade network topology (e.g., the cascade topology shown in FIGS. 9-12), as well as an algorithm for use with such a network for determining a vehicle key location. In particular, FIG. 13 is a simplified, exemplary use case diagram for a cascade topology neural network 30 for determining a location of a vehicle key fob 58. As previously described, the highest level neural network 80 in the cascade topology (IntExt NN) may be used to decide if the key is located inside or outside the vehicle. After that decision, one of two lower level neural network 82, 84 (Ext NN or Int NN) may be used to decide the specific position of the key either outside or inside the vehicle.

Each of the neural networks 80, 82, 84 (IntExt NN, Ext NN, Int NN) may be represented in software as an array of neurons. Each neural network 80, 82, 84 may also include coding information generated by a training tool, such as neuron weights 42, activation functions 43 and activation steepnesses 74. Neuron weights 42 may be represented in software as two dimensional arrays. Activation functions 72 are functions to be called in order to calculate the output of an intermediate or an output neuron. Activation steepnesses are parameters which provide an indication about how fast an activation function goes from a minimum to a maximum.

As seen in FIG. 13, antenna measurements 40, stored coding information 50, and a key detection trigger 86 together act to produce a key location decision 88. In that regard, the key detection trigger 86 is a signal or other mechanism to request a detection or determination of a position of a key fob 58. As previously described, the antenna measurements 40 are the inputs from multiple antennas 68 on a vehicle, the inputs 40 representing signal strengths of wireless signals transmitted between the antennas 68 and the key fob 58. As also previously described, the stored codings 50 are the weights 42, activation functions 43, and activation steepnesses or parameters 74 associated with each of the neural networks 80, 82, 84. Such codings 50 may also include maximum and minimum antenna values and minimum weight.

It should be noted that codings 50 may be stored in a non-volatile random access memory (NVRAM) located onboard the vehicle 60, such as in ECU 90 (see FIG. 4) for use in a vehicle access system. When a key search is triggered, a key position is decided, determined or selected depending or based on antenna field or signal strengths and the codings 50 of the neural networks 80, 82, 84 stored in NVRAM. In that regard, it should also be noted that the ECU 90 and neural networks 30, 80, 82, 84 may be configured or implemented in or as hardware, software, firmware or any combinations thereof, and that neural networks 30, 80, 82, 84 may be implemented as part of ECU 90, another controller or control unit, or separately.

FIG. 14 is a simplified, exemplary flow chart or activity diagram for a method 100 for determining a location of a vehicle key fob 58 using neural networks 80, 82, 84. FIG. 14 depicts an algorithm including the activities, functions or steps involved, as previously described, in determining whether a key is located outside or inside a vehicle, and then determining the particular location of the key outside or inside the vehicle. The method 100 may start with reading antenna values 102. In that regard, the neurons from the input layer of neural network 80 receive the antenna inputs 40. Such activity may be accomplished using arrays as previously described, and an exemplary algorithm for such activity may be illustrated as follows:

```
for (index = 0; index < antenna_no; index++)
    ANS_Network[index] = normalized(Antenna_Strength[index]);
```

The method 100 may also include deciding, selecting or determining 104 an internal or external position of the key fob 58 relative to the vehicle 60. Such activity may be accomplished as previously described by the first neural network 80, and may include calculating every intermediate neuron and the output neuron of the first neural network 80 as also previously described. If the first neural network 80 decides, selects or determines an internal position for the key fob 58, the method 100 may include deciding, selecting or determining 106 a particular interior position of the key fob 58 inside the vehicle 60. Such activity may be accomplished as previously described by the second neural network 82, and may include calculating every intermediate neuron and every output neuron of the second neural network 80 as also previously described. Alternatively, if the first neural network 80 decides, selects or determines an external position for the key fob 58, the method 100 may include deciding, selecting or determining 108 a particular exterior position of the key fob 58 outside the vehicle 60. Such activity may be accomplished as previously described by the third neural network 84, and may include calculating every intermediate neuron and every output neuron of the third neural network 84 as also previously described.

The method 100 may also include returning 110 a particular interior or exterior position of the key fob 58 inside or outside the vehicle 60. The position decided, selected or determined, whether interior or exterior, may be the highest output neuron calculated. Such activity may be accomplished based on the calculations of every intermediate neuron and every output neuron by the appropriate neural network 82, 84 as previously described. In that regard, exemplary algorithms for calculating every intermediate neuron and every output neuron in any of the neural networks 80, 82, 84 may be illustrated as follows:

```
For every intermediate neuron do
{
    sum = 0
    loop through all its inputs
        sum += input value * weight[intermediate neuron][input]
    end loop
    ANS_Network[intermediate neuron] = Activation function (sum *
        activation steepness[intermediate neuron]);
}
For every output neuron do
{
    sum = 0
    loop through all its inputs
        sum += input value * weight[output neuron][input]
    end loop
    ANS_Network[output neuron] = Activation
        function (sum * activation steepness[output neuron]);
}
```

The activities, functions or steps of the system and method for determining the position of a key fob 58 relative to a vehicle 60 described above may also be implemented in or as a computer readable medium having non-transitory computer executable instructions stored thereon for determining a location of a key fob for use in a vehicle access system. More specifically, the computer executable instructions stored on the computer readable medium may include instructions for performing any or all of the activities, functions or steps described above in connection with the system or method disclosed herein.

As is readily apparent from the foregoing, a method, system and product have been described for locating a vehicle key using one or more neural networks. The embodiments described provide a single algorithm that can be used for multiple vehicles, regardless of vehicle type, materials, or the number or locations of vehicle antennas, thereby increasing flexibility. The embodiments described also greatly reduce calibration time in the field, thereby increasing reliability by using the same algorithm and calibration procedure for all vehicles and thus reducing the risk of manual errors during calibration.

While various embodiments of a system, product and method for determining a location of a key fob for use in a vehicle access system have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for determining a location of a key fob for use in a vehicle access system, the location system comprising:
    a control unit for mounting in a vehicle, the control unit configured to receive a plurality of signals, each signal representing a strength of a wireless signal transmitted between the key fob and one of a plurality of antennas located on a vehicle; and
    a plurality of neural networks having a cascade topology, the plurality of neural networks comprising
        a first neural network for determining one of a vehicle internal position and a vehicle external position of the key fob based on the wireless signal strengths, wherein determining one of a vehicle internal position and a vehicle external position comprises calculating a plurality of intermediate internal/external position neurons having learned weights and activation functions associated therewith, and calculating an internal/external output neuron for use in indicating one of the vehicle internal position and the vehicle external position of the key fob,
        a second neural network in communication with the first neural network, the second neural network for determining one of a plurality of vehicle interior positions of the key fob based on the wireless signal strengths, wherein determining one of a plurality of vehicle interior positions comprises calculating a plurality of intermediate interior position neurons having learned weights and activation functions associated therewith, and calculating a plurality of interior position output neurons for use in indicating one of a plurality of vehicle interior positions of the key fob, and
        a third neural network in communication with the first neural network, the third neural network for determining one of a plurality of vehicle exterior positions of the key fob based on the wireless signal strengths, wherein determining one of a plurality of vehicle exterior positions of the key fob comprises calculating a plurality of intermediate exterior position neurons having learned weights and activation functions associated therewith, and calculating a plurality of exterior position output neurons for use in indicating one of a plurality of vehicle exterior positions of the key fob.

2. The system of claim 1 wherein the control unit is further configured to receive a key detection trigger for use in initiating a determination of a key fob location.

3. The system of claim 1 further comprising a plurality of antennas, each antenna configured for mounting at a location on the vehicle.

4. The system of claim 1 further comprising a key fob, the key fob comprising an antenna for enabling communication between the key fob and the plurality of antennas located on the vehicle.

5. The system of claim 1 wherein the learned weights and activation functions associated with the neurons of the plurality of neural networks represent neural network codings for storage in a memory on-board the vehicle.

6. The system of claim 1 wherein the each of the plurality of neural networks is adapted for training to learn the weights and activation functions associated with the neurons of the neural network.

7. The system of claim 1 wherein the plurality of neural networks comprise software for storage in a memory on-board the vehicle.

8. The system of claim 1 wherein
the first neural network comprises eight input neurons, five intermediate internal/external location neurons, and one internal/external output neuron;
the second neural network comprises eight input neurons, three intermediate interior position neurons, and four interior output neurons; and
the third neural network comprises eight input neurons, three intermediate exterior position neurons, and four exterior output neurons.

9. A computer readable medium having non-transitory computer executable instructions stored thereon for determining a location of a key fob for use in a vehicle access system, the computer executable instructions comprising instructions for:
determining one of a vehicle internal position and a vehicle external position of the key fob based on signal strengths of a plurality of wireless signal transmitted between the key fob and a plurality of antennas located on a vehicle, wherein determining one of a vehicle internal position and a vehicle external position comprises a first neural network calculating a plurality of intermediate internal/external position neurons having learned weights and activation functions associated therewith, and calculating an internal/external output neuron for use in indicating one of the vehicle internal position and the vehicle external position of the key fob;
determining one of a plurality of vehicle interior positions of the key fob based on the wireless signal strengths, wherein determining one of a plurality of vehicle interior positions comprises a second neural network calculating a plurality of intermediate interior position neurons having learned weights and activation functions associated therewith, and calculating a plurality of interior position output neurons for use in indicating one of a plurality of vehicle interior positions of the key fob; and
determining one of a plurality of vehicle exterior positions of the key fob based on the wireless signal strengths, wherein determining one of a plurality of vehicle exterior positions of the key fob comprises a third neural network calculating a plurality of intermediate exterior position neurons having learned weights and activation functions associated therewith, and calculating a plurality of exterior position output neurons for use in indicating one of a plurality of vehicle exterior positions of the key fob;
wherein the first, second and third neural networks have a cascade topology.

10. The computer readable medium of claim 9 wherein the computer executable instructions further comprise instructions for initiating a determination of a key fob location based on a key detection trigger.

11. The computer readable medium of claim 9 wherein the computer executable instructions further comprise instructions for storing neural network codings representing the learned weights and activation functions associated with the neurons of the neural networks.

12. The computer readable medium of claim 9 wherein the computer executable instructions further comprise instructions for learning the weights and activation functions associated with the neurons of the neural networks.

13. The computer readable medium of claim 9 wherein
the first neural network comprises eight input neurons, five intermediate internal/external location neurons, and one internal/external output neuron;
the second neural network comprises eight input neurons, three intermediate interior position neurons, and four interior output neurons; and
the third neural network comprises eight input neurons, three intermediate exterior position neurons, and four exterior output neurons.

14. A method for determining a location of a key fob for use in a vehicle access system, the method comprising:
receiving a plurality of signals, each signal representing a strength of a wireless signal transmitted between the key fob and one of a plurality of antennas located on a vehicle;
determining one of a vehicle internal position and a vehicle external position of the key fob based on the wireless signal strengths, wherein determining one of a vehicle internal position and a vehicle external position comprises a first neural network calculating a plurality of intermediate internal/external position neurons having learned weights and activation functions associated therewith, and calculating an internal/external output neuron for use in indicating one of the vehicle internal position and the vehicle external position of the key fob;
determining one of a plurality of vehicle interior positions of the key fob based on the wireless signal strengths, wherein determining one of a plurality of vehicle interior positions comprises a second neural network calculating a plurality of intermediate interior position neurons having learned weights and activation functions associated therewith, and calculating a plurality of interior position output neurons for use in indicating one of a plurality of vehicle interior positions of the key fob; and
determining one of a plurality of vehicle exterior positions of the key fob based on the wireless signal strengths, wherein determining one of a plurality of vehicle exterior positions of the key fob comprises a third neural network calculating a plurality of intermediate exterior position neurons having learned weights and activation functions associated therewith, and calculating a plurality of exterior position output neurons for use in indicating one of a plurality of vehicle exterior positions of the key fob;
wherein the first, second and third neural networks have a cascade topology.

15. The method of claim 14 further comprising receiving a key detection trigger for use in initiating a determination of a key fob location.

16. The method of claim 14 further comprising mounting a plurality of antennas at a plurality of locations on the vehicle.

17. The method of claim 14 further comprising providing a key fob, the key fob comprising an antenna for enabling communication between the key fob and the plurality of antennas located on the vehicle.

18. The method of claim 14 further comprising storing, in a memory on-board the vehicle, neural network codings representing the learned weights and activation functions associated with the neurons of the neural networks.

19. The method of claim 14 further comprising learning, by each of the neural networks, the weights and activation functions associated with the neurons of the neural network.

20. The method of claim 14 wherein
- the first neural network comprises eight input neurons, five intermediate internal/external location neurons, and one internal/external output neuron;
- the second neural network comprises eight input neurons, three intermediate interior position neurons, and four interior output neurons; and
- the third neural network comprises eight input neurons, three intermediate exterior position neurons, and four exterior output neurons.

\* \* \* \* \*